US012738835B2

(12) United States Patent
Gomes et al.

(10) Patent No.: US 12,738,835 B2
(45) Date of Patent: Sep. 15, 2026

(54) METHOD FOR IMPLEMENTING A FULL INPUT SOURCE POWER INPUT CONTROL FUNCTION ON MULTIPLE POWER INPUTS TO A SINGLE LLC CONVERTER IN A DISTRIBUTION SYSTEM

(71) Applicant: Hamilton Sundstrand Corporation, Charlotte, NC (US)

(72) Inventors: Alex Gomes, Chicago, IL (US); Joshua C. Swenson, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 220 days.

(21) Appl. No.: 18/762,486

(22) Filed: Jul. 2, 2024

(65) Prior Publication Data

US 2026/0012098 A1 Jan. 8, 2026

(51) Int. Cl.
*H02M 1/32* (2007.01)
*H02M 1/36* (2007.01)
*H02M 3/00* (2006.01)
*H02M 3/335* (2006.01)

(52) U.S. Cl.
CPC ............. *H02M 1/325* (2021.05); *H02M 1/36* (2013.01); *H02M 3/01* (2021.05); *H02M 3/33523* (2013.01); *H02M 3/33571* (2021.05); *H02M 3/33573* (2021.05)

(58) Field of Classification Search
CPC .......... H02M 1/325; H02M 1/36; H02M 3/01; H02M 3/33523; H02M 3/33571; H02M 3/33573
See application file for complete search history.

(56) References Cited

U.S. PATENT DOCUMENTS 9,450,500 B2 9/2016 Zimmanck
10,770,975 B2 9/2020 Mao et al.
11,509,228 B2 11/2022 Deboy et al.
11,594,948 B2 2/2023 Morrison et al.
11,652,408 B2 5/2023 Grbovic et al.
12,261,530 B2 * 3/2025 Terrace .................. H02M 1/10
2021/0351713 A1 11/2021 Garcia i Tormo et al.
2023/0089638 A1 * 3/2023 Liu ......................... H02J 7/485 320/106
2023/0103777 A1 4/2023 Fernandez-Mattos et al.
2024/0039399 A1 2/2024 Alvarez et al.
2025/0266675 A1 * 8/2025 Kondo ..................... H02H 3/12

* cited by examiner

*Primary Examiner* — Lakaisha Jackson

(57) ABSTRACT

A power SS circuit includes N power input circuits, an output node configured to connect to an input node of voltage-fed power converter, and a control interface that receives control signals for controlling operational/non-operational states switches within the power input circuits. The power input circuits include N input nodes connected to N power sources, respectively. Each respective power input circuit includes: a SS capacitor including a first terminal connected to ground; an SS switch including a first terminal as a respective input node among the input nodes and configured to connect a second terminal of the SS capacitor to the respective input node in the operational state; and a voltage-fed converter switch including a first terminal connected to a second terminal of the SS switch and configured to connect the second terminal of the SS capacitor to the output node of power SS circuit in the operational state.

20 Claims, 4 Drawing Sheets

METHOD FOR IMPLEMENTING A FULL INPUT SOURCE POWER INPUT CONTROL FUNCTION ON MULTIPLE POWER INPUTS TO A SINGLE LLC CONVERTER IN A DISTRIBUTION SYSTEM

TECHNICAL FIELD

This disclosure relates generally to electrical circuits. More specifically, this disclosure relates to a method for implementing a full input source power input control function on multiple power inputs to a single LLC converter in a distribution system.

BACKGROUND

In an electrical power system distribution, power separation and power control are desirable features. In the electrical power system distribution, an LLC converter is typically connected to a single upstream distribution electrical bus. This electrical bus can lose power or stop operating, for example, due to faults, failures, or power transients. If this electrical bus loses power, the LLC will be affected, and consequently, the loads and functions that the LLC feeds will also be affected. Typical electrical system distribution requirements specify that within an electrical power system that includes multiple input busses, the multiple input busses do not feed each other. Accordingly, a power/energy blocking feature is used to within an electrical power system that includes multiple input busses.

SUMMARY

This disclosure relates to a method for implementing a full input source power input control function on multiple power inputs to a single LLC converter in a distribution system.

In some embodiments, power source-selection circuit includes N power input circuits, an output node, and a control interface. The N power input circuits include N input nodes configured to connect to N power sources, respectively. The output node is configured to connect to an input node of a voltage-fed power converter (power converter). The control interface is configured to receive at least one control signal from a control circuit for controlling operational/non-operational states of a plurality of switches within the N power input circuits. Among the N power input circuits, each respective power input circuit includes: a source-selection capacitor including a first terminal configured to connect to a ground node of the power converter; a power source-selection switch including a first terminal as a respective input node among the N input nodes and configured to connect a second terminal of the source-selection capacitor to the respective input node in the operational state of the power source-selection switch; and a voltage-fed converter switch including a first terminal connected to a second terminal of the power source-selection switch and configured to connect the second terminal of the source-selection capacitor to the output node of power source-selection circuit in the operational state of the voltage-fed converter switch. The plurality of switches includes the power source-selection switch and the voltage-fed converter switch of the respective power input circuit.

In some other embodiments, an electronic device includes a voltage-fed power converter (power converter) and a power source-selection circuit. The power converter includes an input node, a ground node, and a first switch configured to connect the input node to the ground node in an operational state of the first switch. The power source-selection circuit includes N power input circuits, an output node, and a control interface. The N power input circuits include N input nodes configured to connect to N power sources, respectively. The output node is configured to connect to the input node of the power converter. The control interface is configured to receive at least one control signal from a control circuit for controlling operational/non-operational states of a plurality of switches within the N power input circuits. Among the N power input circuits, each respective power input circuit includes: a source-selection capacitor including a first terminal configured to connect to a ground node of the power converter; a power source-selection switch including a first terminal as a respective input node among the N input nodes and configured to connect a second terminal of the source-selection capacitor to the respective input node in the operational state of the power source-selection switch; and a voltage-fed converter switch including a first terminal connected to a second terminal of the power source-selection switch and configured to connect the second terminal of the source-selection capacitor to the output node of power source-selection circuit in the operational state of the voltage-fed converter switch. The plurality of switches includes the power source-selection switch and the voltage-fed converter switch of the respective power input circuit.

In still other embodiments, a system includes a power source-selection circuit and a control circuit. The power source-selection circuit includes N power input circuits, an output node, and a control interface. The N power input circuits include N input nodes configured to connect to N power sources, respectively. The output node is configured to connect to an input node of a voltage-fed power converter (power converter). The control interface is configured to receive at least one control signal from the control circuit for controlling operational/non-operational states of a plurality of switches within the N power input circuits. Among the N power input circuits, each respective power input circuit includes: a source-selection capacitor including a first terminal configured to connect to a ground node of the power converter; a power source-selection switch including a first terminal as a respective input node among the N input nodes and configured to connect a second terminal of the source-selection capacitor to the respective input node in the operational state of the power source-selection switch; and a voltage-fed converter switch including a first terminal connected to a second terminal of the power source-selection switch and configured to connect the second terminal of the source-selection capacitor to the output node of power source-selection circuit in the operational state of the voltage-fed converter switch. The plurality of switches includes the power source-selection switch and the voltage-fed converter switch of the respective power input circuit. The control circuit is configured to output the at least one control signal to the control interface.

Any single one or any combination of the following features may be used with the above embodiments. The N power input circuits comprises a first power input circuit and a second power input circuit; the input node of the first power input circuit is configured to connect to a first power source; and the input node of the second power input circuit is configured to connect to a second power source. In response to receiving the at least one control signal from the control circuit, the first power input circuit is configured to conduct electric energy received from the first power source to the output node of the power source-selection circuit, and the second power input circuit is configured to block electrical energy applied to the input node of the second power input circuit. The at least one control signal includes: a first control signal for setting the power source-selection switch and the voltage-fed converter switch of the first power input circuit to the operational state; and a second control signal for setting the power source-selection switch and the voltage-fed converter switch of the second power input circuit to the non-operational state. In response to receiving the at least one control signal from the control circuit, the second power input circuit is configured to conduct electric energy received from the second power source to the output node of the power source-selection circuit, and the first power input circuit is configured to block electrical energy applied to the input node of the first power input circuit. The at least one control signal includes a third control signal for setting the power source-selection switch and the voltage-fed converter switch of the first power input circuit to the non-operational state; and a fourth control signal for setting the power source-selection switch and the voltage-fed converter switch of the second power input circuit to the operational state. In some embodiments of the power source-selection circuit, N is greater than two; and the N power input circuits comprise a selected power input circuit and N−1 non-selected power input circuits. The at least one control signal includes: a first control signal for setting the power source-selection switch and the voltage-fed converter switch of the selected power input circuit to the operational state; and a second control signal for setting the power source-selection switch and the voltage-fed converter switch of the non-selected power input circuits to the non-operational state. In response to receiving the at least one control signal from the control circuit, the selected power input circuit is configured to conduct electric energy received at the input node of the selected power input circuit to the output node of the power source-selection circuit, and the non-selected power input circuits are configured to block electrical energy applied to the input nodes of the non-selected power input circuits. Within each respective power input circuit, an area that the power source-selection switch occupies is larger than an area that the voltage-fed converter switch occupies. Within each respective power input circuit, an area that the power source-selection switch occupies is larger than a combined area that the voltage-fed converter switch and the source-selection capacitor occupy. Within each respective power input circuit, a switching speed at which the voltage-fed converter switch operates is faster than a switching speed at which the power source-selection switch operates. The power converter further includes: a resonant tank that includes a resonant tank inductor ($L_r$), a magnetizing inductor ($L_m$), and a resonant tank capacitor ($C_r$); a transformer with rectifier; and an output capacitor.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Figure 1:
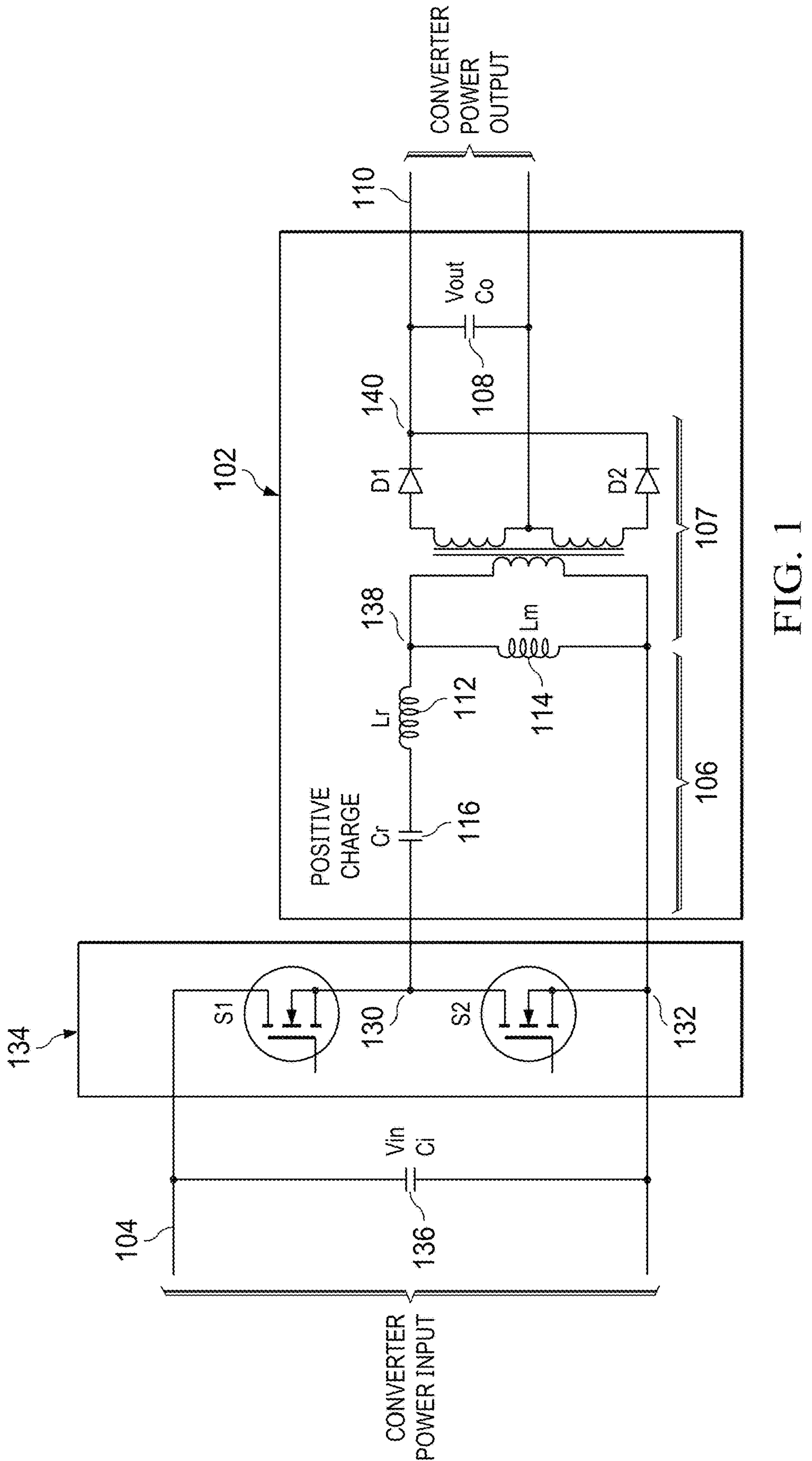
FIG. 1 illustrates a single resonant converter (LLC converter) coupled to a single power input.

FIG. 1 illustrates a single resonant converter (LLC converter) 102 coupled to a single power input 104. The LLC converter 102 further includes: a resonant tank 106, a transformer with rectifier 107, and an output capacitor 108 coupled to an output node 110 of the LLC converter 102. The resonant tank 106 includes a resonant tank inductor ($L_r$) 112, a magnetizing inductor ($L_m$) 114, and a resonant tank capacitor ($C_r$) 116. The transformer with rectifier 107 includes a first diode (D1) 118 and a second diode (D2) 120 connected to the output node 110. The LLC converter 102 includes an input node 130 and a ground node 132 connected to switches S1 and S2 of switching bridge 134. The LLC converter 102 is only an example of a half-bridge voltage-fed power converter, and other half-bridge voltage-fed power converter topologies could be used instead, without departing from the scope this disclosure.

A switching bridge 134 includes a first switch S1 connected to the single power input 104 at a first terminal and connected to the input node 130 of the LLC converter at a second terminal. The switching bridge 134 includes a second switch S2 connected to the input node 130 of the LLC converter at a first terminal and connected to the ground node 132 at a second terminal.

A power source can connect to the single power input 104 and supply electrical energy at an input voltage ($V_{in}$) at the single power input 104, which also the voltage associated with an input capacitor ($C_i$) 136. The $V_{in}$ associated with the input capacitor 136 can be a positive direct current (DC) voltage. The input capacitor 136 is connected to the single power input 104 at a first terminal, and connected to the ground node 132 at a second terminal. When the first switch S1 is in the operational state, the electrical energy received from the power source is conducted from the single power input 104 to the input node 130 of the LLC converter 102. When the second switch S2 is in the operational state, the second switch S2 connects the input node 130 to the ground node 132. When the electrical energy from the power source is received at the input node 130 of the LLC converter 102, the resonant tank 106 generates an alternating current (AC) at a magnetizing node 138, which the transformer with rectifier 107 converts to a direct current at an intermediate node 140.

The single resonant converter (LLC converter) 102 coupled to a single power input 104, as shown in FIG. 1, exhibits a problem of being limited to connecting to only a single power source to the LLC converter, and thus does not allow any selection of a power source.

Figure 2:
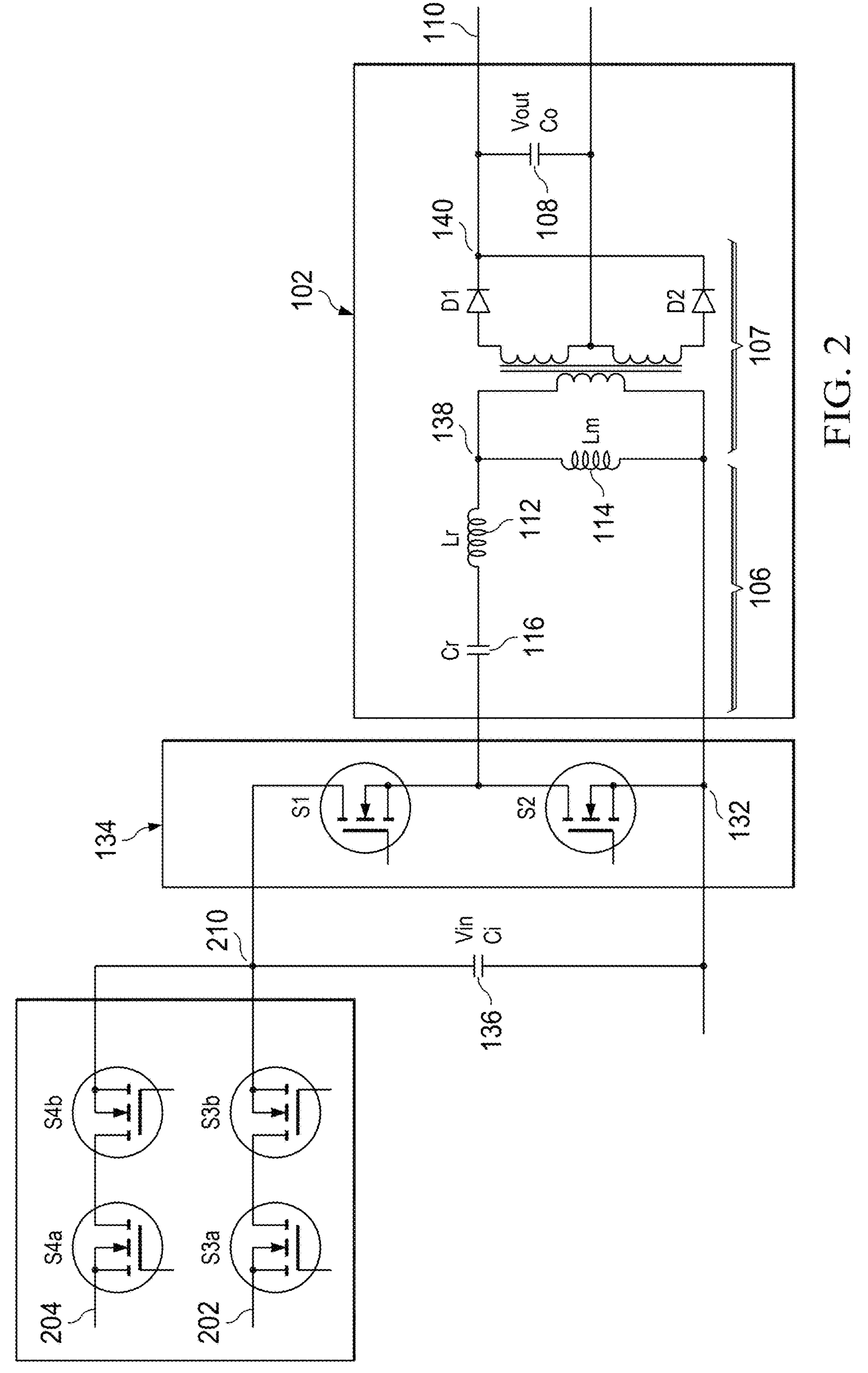
FIG. 2 illustrates the single LLC converter of FIG. 1 coupled to a dual power inputs.

FIG. 2 illustrates the single LLC converter 102 of FIG. 1 coupled to a dual power inputs 202 and 204. In FIG. 2, the switching bridge 134 and input capacitor ($C_i$) 136 associated with the input voltage ($V_{in}$) are the same as shown in FIG. 1. The first power input 202 and second power input 204 connect to a first power source and to a second power source (not shown), respectively.

A first pair of power source-selection switches S3A and S3B, which are connected to each other in series, connected to the first power input 202 at one end, and connected to the first terminal 210 of the first switch S1 of the switching bridge 134. Similarly, a second pair of power source-selection switches S4A and S4B, which are connected to each other in series, connected to the second power input 204 at one end, and connected to the first terminal 210 of the first switch S1 of the switching bridge 134.

An advantage of the electric power distribution system shown in FIG. 2 is that a control circuit (not shown) can be connected to a control interface (such as gate terminals) of the first and second pairs of switches S3A and S3B and S4A and S4B, and can be connected to a control interface (such as gate terminals) of the first and second switches S1 and S2 of the switching bridge 134. Th control circuit generates and sends one or more control signals for controlling which power source (100% from P1; or 100% from P2; or 50% from each of P1 and P2) provides power to a load. The load connects to the output node 110 of the LLC converter 102, in order to receive the output voltage ($V_{out}$) associated with the output capacitor ($C_o$). The control circuit is able to connect the load to the first power source, which is connected to the first power input 202, and to block the second power source from being connected to the load. More particularly, when the first pair of power source-selection switches S3A and S3B in the operational state, and the second pair of power source-selection switches S4A and S4B are in the non-operational state, the load receives electrical energy (referred to herein as P1) from the first power source, and does not receive any electric energy referred to herein a P2) that the second power source supplies to the second power input 204.

Analogously, control circuit is able to connect the load to the second power source to receive P2, and disconnect the load from the first power source to block P2. For this particular example, the control circuit controls the operational/non-operational states (such as ON/OFF states) of the switches such that the first pair of power source-selection switches S3A and S3B are the non-operational state, and the second pair of power source-selection switches S4A and S4B are in the operational state.

Unlike the single power source of FIG. 1, the LLC converter 102 of FIG. 2 is able to connect to dual power inputs that receive electrical energy from two power sources, respectively. However, one problem associated with the pair of power source-selection switches is size. The amount of physical space (such as area or volume) that one power source-selection switch occupies is a challenging design packaging constraint to overcome. That is, an area that one power source-selection switch (such as S3*a*, S3*b*, S4*a*, or S4*b*) occupies is larger than an area that one resonant converter switch (such as S1 or S2) occupies. In this disclosure, resonant converter switches can also referred to as voltage-fed power converter switch, or as a switching converter switch. By comparison, the single power source of FIG. 1 does not include any power source-selection switch, while the dual power inputs of FIG. 2 include four power source-selection switches.

The electric power distribution system shown in FIG. 2 exhibits another problem of efficiency. Each additional switch in the circuit decreases efficiency of the circuit. The electric power distribution system shown in FIG. 2 is a typical architecture of "back-to-back" MOSFETs, which enables the ability to source independent distribution power input, however at the expense of lower efficiencies (for example, higher impedance due to two back-to-back MOSFETS for each power inputs). The electric power distribution system shown in FIG. 2 includes six switches S1, S2, S3A-S3B, and S4A-S4B. Thus, the six switches cause the system shown in FIG. 2 to perform at a lower efficiency compared to the higher efficiency associated with only two switches in the system of FIG. 1.

If the electric power distribution system shown in FIG. 2 were scaled up to connect to a third power source, then a third pair of power source-selection switches would be connected to the first terminal 210. In the size of the system would increase by at least the size of two power source-selection switches, and the system efficiency would decrease based on the addition of two switches.

Figure 3:
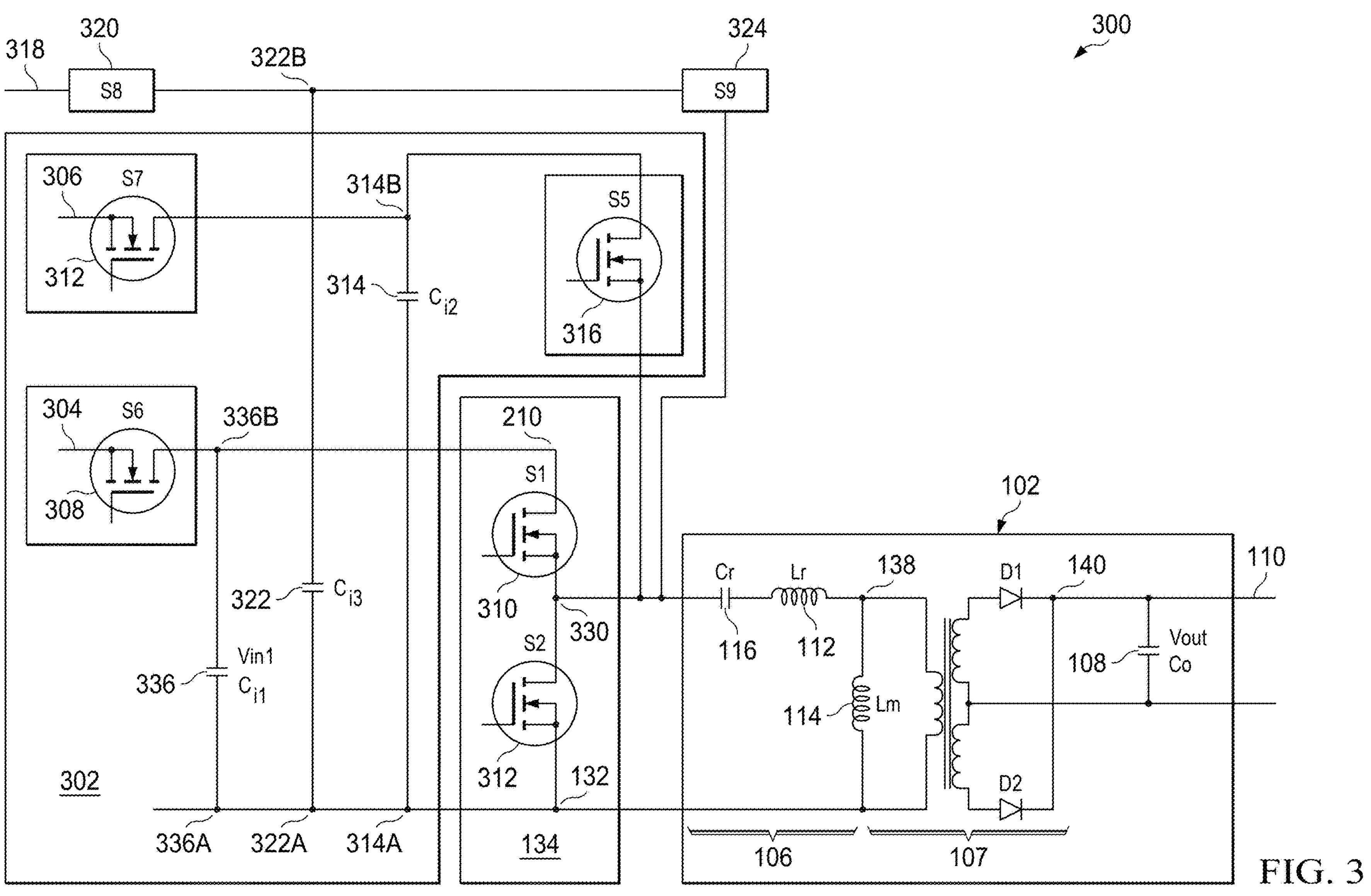
FIG. 3 illustrates the single LLC converter of FIG. 1 coupled to a power source-selection circuit including a scalable number of multiple power inputs in a distribution system, according to embodiments of this disclosure.

FIG. 3 illustrates the single LLC converter 102 of FIG. 1 coupled to a power source-selection circuit 302 including a scalable number (N) of multiple power inputs in a distribution system 300, according to embodiments of this disclosure. Within the electric power distribution system 300, the LLC converter 102, the first and second switches S1 and S2 of the switching bridge 134 are the same as shown in FIG. 1. The input capacitor 136 associated with the input voltage ($V_{in}$) of FIG. 1 can be the same as the first source-selection (SS) capacitor ($C_{i1}$) 336 associated with a first input voltage ($V_{in1}$) of FIG. 3. The first terminal 210 of the first switch S1 is the same as shown in FIG. 2.

The electric power distribution system 300 includes the power source-selection circuit 302 and a control circuit (not shown) for controlling operational/non-operational states of a plurality of switches within electric power distribution system 300. The power source-selection circuit 302 includes N power input circuits, an output node 330, and a control interface (such as gate terminals of switches).

The N power input circuits include N input nodes configured to connect to N power sources, respectively. Particularly, a first power input circuit includes a first input node 304 connected to a first power source (not shown) that supplies electrical energy referred to as first electrical power (P1). Similarly, a second power input circuit includes a second input node 306 connected to a second power source (not shown) that supplies electrical energy referred to as second electrical power (P2).

Among the N power input circuits, each respective power input circuit includes: power source-selection switch, a SS capacitor, and resonant converter switch. Particularly, a first power input circuit includes a first power source-selection switch (S6) 308, a first SS capacitor 336, and a first resonant converter switch 310. The resonant converter switch 310 of the first power input circuit also functions as the first switch S1 of the switching bridge 134. A second power input circuit includes a second power source-selection switch (S7) 312, a second SS capacitor ($C_{i2}$) 314, and a second resonant converter switch (S5) 316.

In electric power distribution system 300, N can be greater than two (2) in some embodiments. Analogously, an Nth power input circuit includes an Nth input node 318 connected to an Nth power source (not shown) that supplies electrical energy referred to as Nth electrical power ($P_N$ or P3). For example, if N=3, then a third power input circuit includes a third power source-selection switch (S8) 320, a third SS capacitor ($C_{i3}$) 322, and a third resonant converter switch (S9) 324.

Among the N power input circuits, each respective power input circuit includes a SS capacitor including a first terminal configured to connect to a ground node o132 f the LLC converter. Particularly, the first, second, and third SS capacitors include a first terminal 336*a*, 314*a*, 322*a*, respectively connected to the ground node 132.

Each respective power input circuit includes: a power source-selection switch including a first terminal as a respective input node among the N input nodes and configured to connect a second terminal of the SS capacitor to the respective input node in the operational state of the power source-selection switch. Particularly, the input nodes 304, 306, and 318 of the first, second, and third power input circuits are the first terminal of the first, second, and third power source-selection switches 308, 312, and 320, respectively. As an example, when the first power source-selection switch 308 is in the operational state, a second terminal 336*b* of the SS capacitor is connected to the first input node 304, thereby also connected to the first power source.

Each respective power input circuit includes: a resonant converter switch including a first terminal connected to a second terminal of the power source-selection switch and configured to connect the second terminal of the SS capacitor to the output node of power source-selection circuit in the operational state of the resonant converter switch. Particularly, the second terminals 336*b*, 314*b*, and 322*b* of the first, second, and third SS capacitors are respectively connected to the first terminal of the first, second, and third resonant converter switches 310, 316, and 324. As such, the first terminal of the first resonant converter switch 310 is connected to the second terminal of the first power source-selection switch 308. The first terminal of the second resonant converter switch 316 is connected to the second terminal of the second power source-selection switch 312. The first terminal of the third resonant converter switch 324 is connected to the second terminal of the third power source-selection switch 320. As an example, when the first resonant converter switch is in the operational state, the second terminal 336*b* of the first SS capacitor 336 is connected to the output node 330 of the power source-selection circuit.

Within the power source-selection circuit 302, the output node 330 is configured to connect to an input node (130 of FIG. 1) of the LLC converter 102. For example, the input node 130 of the LLC converter of FIG. 1 can be the same as the output node 330 of the power source-selection circuit 302 of FIG. 3. In this example, if the power source-selection circuit 302 is disconnected from the LLC converter 102, then half (such as the first switch S1) of the switching bridge 134 disconnects, while the other half (such as the second switch S2) of the switch bridge remains connected to the LLC converter 102 at the input node (130 of FIG. 1) the ground node 132.

Within the power source-selection circuit 302, the control interface is configured to receive at least one control signal from the control circuit for controlling operational/non-operational states of a plurality of switches within the N power input circuits. The plurality of switches includes the power source-selection switch and the resonant converter switch of the respective power input circuit. The control circuit generates and sends one or more one control signals to the control interface. For example, the control interface can include gate terminals of each switch within the plurality of switches (such as S1, S5, S6, S7, S8, and S9) within the power source-selection circuit 302. More generally, a control interface of the electric power distribution system 300 can include gate terminals of each switch within the plurality of switches (such as S1-S9 including S2) within the system 300.

The power source-selection circuit 302 provides practical and technical advantages that cannot be obtained in the electric power distribution systems of FIG. 1 or FIG. 2. As one advantage, power source-selection circuit 302 enables multiple power inputs to be connected to the input node (330 of FIG. 3) the LLC converter 102. By enabling multiple power sources to connect to the LLC converter, the load can receive power from an available power source while another power source is faulted or unavailable. The power source-selection circuit 302 employs a different circuit architecture (different than the systems of FIGS. 1 and 2) providing source-selection from multiple distribution power inputs, with a reduced number of input MOSFETS (reducing component losses).

Another advantage of the power source-selection circuit 302 is increased efficiency based on a reduced number of switches, compared to the system of FIG. 2. Each additional switch in the circuit decreases efficiency of the circuit. Ignoring the switch S2, which is present in both the systems of FIGS. 2 and 3, and in a case in which N=2, the power source-selection circuit 302 includes only four switches (S1, S5, S6, and S7) while the system of FIG. 2 includes five switches (S1, S3*a*-S3*b*, and S4*a*-S4*b*). Thus, the five switches cause the system shown in FIG. 2 to perform at a lower efficiency compared to the higher efficiency associated with only four switches in the power source-selection circuit 302 of FIG. 3.

Another advantage of the power source-selection circuit 302 is reduced size and space savings. The power source-selection switch occupies is larger than a combined area that the resonant converter switch and the SS capacitor occupy. For each power source, although the system 300 includes one more component than the system of FIG. 2. In comparison, for each power source, the system 300 of FIG. 3 includes three components: one power source-selection switch, one SS capacitor, and one resonant converter switch (for example, including three components 308, 336, 310). Each power source-selection circuit in FIG. 3 occupies less space than a pair of power source-selection switches (such as S3A and S3B), which is two components in the system of FIG. 2.

Another advantage the power source-selection circuit 302 is switching speed. Particularly, the switching speed at which a resonant converter switch operates is faster than the switching speed at which the power source-selection switch operates. For each power source, the systems of FIGS. 2 and 3 include two switches, a power source-selection switch and another switch. This other switch is a faster-switching resonant converter switch in the power source-selection circuit of FIG. 3, and this other switch is a slower-switching power source-selection switch in the system of FIG. 2.

For ease of comparison, the systems in FIGS. 1, 2, and 3 have same input voltage and the same output voltage. The plurality of switches can be MOSFETs.

Figure 4:
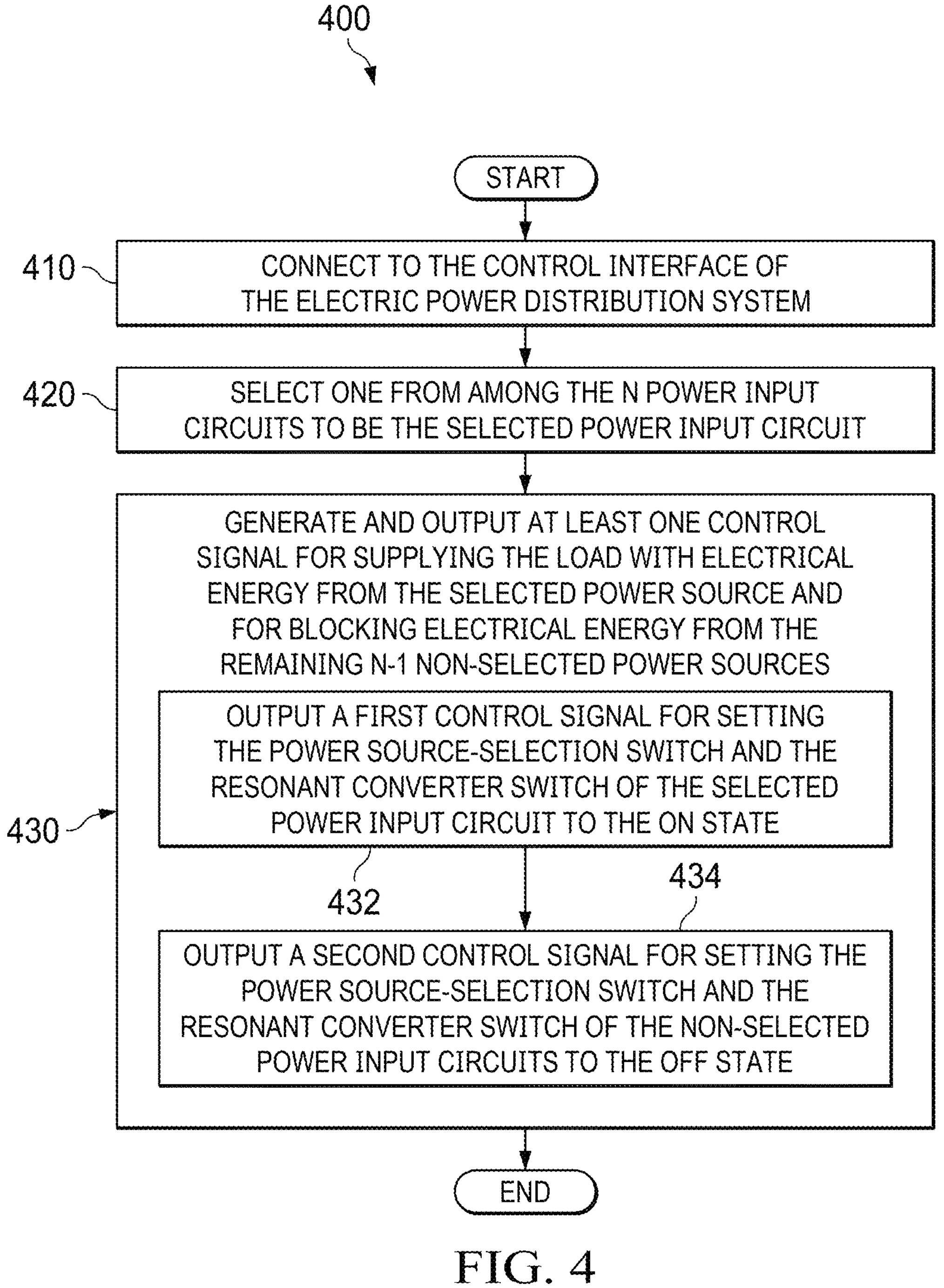
FIG. 4 illustrates a method for implementing a full input source power input control function on multiple power inputs to a single LLC converter in a distribution system, according to embodiments of this disclosure.

FIG. 4 illustrates a method 400 for implementing a full input source power input control function on multiple power inputs to a single LLC converter in a distribution system, according to embodiments of this disclosure. The method 400 can be implemented by a control circuit, such as a computer or controller, that is configured to control the operational/non-operational states of the switches within the electric power distribution system 300 of FIG. 3.

At block 410, the control circuit connects to the control interface of the electric power distribution system 300.

At block 420, the control circuit selects one from among the N power input circuits to be the selected power input circuit. Accordingly, from among N power sources counted to the N power input circuits, a selected power source is identified based on being connected to the input node of the selected power input circuit. By selecting the selected power input circuit, the control circuit determines to block power from the remaining N−1 non-selected power input circuits.

At block 430, the control circuit generates and outputs at least one control signal for supplying the load (which is connected to the output node 110 of the LLC converter 102) with electrical energy from the selected power source and for blocking (such as disconnecting) electrical energy from the remaining N−1 non-selected power sources. The at least one control signal includes a first control signal for setting the power source-selection switch and the resonant converter switch of the selected power input circuit to the operational state. The at least one control signal includes a second control signal for setting the power source-selection switch and the resonant converter switch of the non-selected power input circuits to the non-operational state. In response to receiving the at least one control signal from the control circuit, the selected power input circuit is configured to conduct electric energy received at the input node of the selected power input circuit to the output node of the power source-selection circuit, and the non-selected power input circuits are configured to block electrical energy applied to the input nodes of the non-selected power input circuits. The selected power input circuit receives the first control signal, and the remaining N−1 non-selected power sources receive the second control signal.

For example, in the case of N=2, if the first power source is selected such that P1 is used at the first power input 304, then the control circuit activates (set the operational state for) S6 and controls the two switches S1-S2 of the switching bridge 134 for operation of the LLC converter 102. Also, the control circuit deactivates (sets the non-operational state for) S5 and S7. By setting the non-operational state in the second power source-selection switch (S7) 306, the switch S7 performs the power blocking through MOSFET body diode.

In another example case of N=2, if the second power source is selected such that P2 is used at the second power input 306, then the control circuit activates S7. For controlling operation of the LLC converter 102, the control circuit controls both the second resonant converter (S5) 316 and the second switch S2 as the switching bridge. Also, the control circuit deactivates (sets the non-operational state for) S1 and S6. By setting the non-operational state in the first power source-selection switch (S6) 306, the switch S6 performs the power blocking through MOSFET body diode.

Together, the system 300 and method 400 of FIGS. 3 and 4 provide appropriate power blocking, with minimal addition of components connected to the LLC converter. This method 400 of controls the different circuit architecture employed in the power source-selection circuit 302 of FIG. 3, without using a typical architecture of the "back-to-back" MOSFETs (such as S3*a*-S3*b*, or S4*a*-S4*b*) of FIG. 2.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A power source-selection circuit comprising:

N power input circuits comprising N input nodes configured to connect to N power sources, respectively;

an output node configured to connect to an input node of a voltage-fed power converter; and a control interface configured to receive at least one control signal from a control circuit for controlling operational/non-operational states of a plurality of switches within the N power input circuits, wherein, among the N power input circuits, each respective power input circuit includes:

a source-selection capacitor including a first terminal configured to connect to a ground node of the power converter;

a power source-selection switch including a first terminal as a respective input node among the N input nodes and configured to connect a second terminal of the source-selection capacitor to the respective input node in the operational state of the power source-selection switch; and a voltage-fed converter switch including a first terminal connected to a second terminal of the power source-selection switch and configured to connect the second terminal of the source-selection capacitor to the output node of the power source-selection circuit in the operational state of the voltage-fed converter switch; and wherein the plurality of switches includes the power source-selection switch and the voltage-fed converter switch of the respective power input circuit.

2. The power source-selection circuit of claim 1, wherein: the N power input circuits comprise a first power input circuit and a second power input circuit; the input node of the first power input circuit is configured to connect to a first power source; and the input node of the second power input circuit is configured to connect to a second power source.

3. The power source-selection circuit of claim 2, wherein: in response to receiving the at least one control signal from the control circuit, the first power input circuit is configured to conduct electric energy received from the first power source to the output node of the power source-selection circuit, and the second power input circuit is configured to block electrical energy applied to the input node of the second power input circuit; and the at least one control signal includes: a first control signal for setting the power source-selection switch and the voltage-fed converter switch of the first power input circuit to the operational state; and a second control signal for setting the power source-selection switch and the voltage-fed converter switch of the second power input circuit to the non-operational state.

4. The power source-selection circuit of claim 2, wherein: in response to receiving the at least one control signal from the control circuit, the second power input circuit is configured to conduct electric energy received from the second power source to the output node of the power source-selection circuit, and the first power input circuit is configured to block electrical energy applied to the input node of the first power input circuit; and the at least one control signal includes: a first control signal for setting the power source-selection switch and the voltage-fed converter switch of the first power input circuit to the non-operational state; and a second control signal for setting the power source-selection switch and the voltage-fed converter switch of the second power input circuit to the operational state.

5. The power source-selection circuit of claim 1, wherein: N is greater than two; the N power input circuits comprise a selected power input circuit and N−1 non-selected power input circuits; the at least one control signal includes: a first control signal for setting the power source-selection switch and the voltage-fed converter switch of the selected power input circuit to the operational state; and a second control signal for setting the power source-selection switch and the voltage-fed converter switch of the non-selected power input circuits to the non-operational state; and in response to receiving the at least one control signal from the control circuit, the selected power input circuit is configured to conduct electric energy received at the input node of the selected power input circuit to the output node of the power source-selection circuit, and the non-selected power input circuits are configured to block electrical energy applied to the input nodes of the non-selected power input circuits.

6. The power source-selection circuit of claim 1, wherein, within each respective power input circuit, an area that the power source-selection switch occupies is larger than an area that the voltage-fed converter switch occupies.

7. The power source-selection circuit of claim 1, wherein, within each respective power input circuit, an area that the power source-selection switch occupies is larger than a combined area that the voltage-fed converter switch and the source-selection capacitor occupy.

8. The power source-selection circuit of claim 1, wherein, within each respective power input circuit, a switching speed at which the voltage-fed converter switch operates is faster than a switching speed at which the power source-selection switch operates.

9. An electronic device comprising: a voltage-fed power converter including an input node, a ground node, and a first switch configured to connect the input node to the ground node in an operational state of the first switch; and a power source-selection circuit comprising: N power input circuits comprising N input nodes configured to connect to N power sources, respectively; an output node configured to connect to the input node of the power converter; and a control interface configured to receive at least one control signal from a control circuit for controlling operational/non-operational states of a plurality of switches within the N power input circuits, wherein among the N power input circuits, each respective power input circuit includes: a source-selection capacitor including a first terminal configured to connect to the ground node of the power converter; a power source-selection switch including a first terminal as a respective input node among the N input nodes and configured to connect a second terminal of the source-selection capacitor to the respective input node in the operational state of the power source-selection switch; and a voltage-fed converter switch including a first terminal connected to a second terminal of the power source-selection switch and configured to connect the second terminal of the source-selection capacitor to the output node of the power source-selection circuit in the operational state of the voltage-fed converter switch; and wherein the plurality of switches includes the power source-selection switch and the voltage-fed converter switch of the respective power input circuit.

10. The electronic device of claim 9, wherein: the N power input circuits comprise a first power input circuit and a second power input circuit; the input node of the first power input circuit is configured to connect to a first power source; and the input node of the second power input circuit is configured to connect to a second power source.

11. The electronic device of claim 10, wherein: in response to receiving the at least one control signal from the control circuit, the first power input circuit is configured to conduct electric energy received from the first power source to the output node of the power source-selection circuit, and the second power input circuit is configured to block electrical energy applied to the input node of the second power input circuit; and the at least one control signal includes: a first control signal for setting the power source-selection switch and the voltage-fed converter switch of the first power input circuit to the operational state; and a second control signal for setting the power source-selection switch and the voltage-fed converter switch of the second power input circuit to the non-operational state.

12. The electronic device of claim 10, wherein:

in response to receiving the at least one control signal from the control circuit, the second power input circuit is configured to conduct electric energy received from the second power source to the output node of the power source-selection circuit, and the first power input circuit is configured to block electrical energy applied to the input node of the first power input circuit; and the at least one control signal includes:

a first control signal for setting the power source-selection switch and the voltage-fed converter switch of the first power input circuit to the non-operational state; and a second control signal for setting the power source-selection switch and the voltage-fed converter switch of the second power input circuit to the operational state.

13. The electronic device of claim 9, wherein:

N is greater than two;

the N power input circuits comprise a selected power input circuit and N−1 non-selected power input circuits;

the at least one control signal includes:

a first control signal for setting the power source-selection switch and the voltage-fed converter switch of the selected power input circuit to the operational state; and a second control signal for setting the power source-selection switch and the voltage-fed converter switch of the non-selected power input circuits to the non-operational state; and in response to receiving the at least one control signal from the control circuit, the selected power input circuit is configured to conduct electric energy received at the input node of the selected power input circuit to the output node of the power source-selection circuit, and the non-selected power input circuits are configured to block electrical energy applied to the input nodes of the non-selected power input circuits.

14. The electronic device of claim 9, wherein within each respective power input circuit, an area that the power source-selection switch occupies is larger than an area that the voltage-fed converter switch occupies.

15. The electronic device of claim 9, wherein within each respective power input circuit, an area that the power source-selection switch occupies is larger than a combined area that the voltage-fed converter switch and the source-selection capacitor occupy.

16. The electronic device of claim 9, wherein within each respective power input circuit, a switching speed at which the voltage-fed converter switch operates is faster than a switching speed at which the power source-selection switch operates.

17. The electronic device of claim 9, wherein the power converter further includes:

a resonant tank that includes a resonant tank inductor, a magnetizing inductor, and a resonant tank capacitor;

a transformer with a rectifier; and an output capacitor.

18. A system comprising:

a power source-selection circuit that comprises:

N power input circuits comprising N input nodes configured to connect to N power sources, respectively;

an output node configured to connect to an input node of a voltage-fed power converter; and a control interface configured to receive at least one control signal from a control circuit for controlling operational/non-operational states of a plurality of switches within the N power input circuits, wherein among the N power input circuits, each respective power input circuit includes:

a source-selection capacitor including a first terminal configured to connect to a ground node of the power converter;

a power source-selection switch including a first terminal as a respective input node among the N input nodes and configured to connect a second terminal of the source-selection capacitor to the respective input node in the operational state of the power source-selection switch; and a voltage-fed converter switch including a first terminal connected to a second terminal of the power source-selection switch and configured to connect the second terminal of the source-selection capacitor to the output node of the power source-selection circuit in the operational state of the voltage-fed converter switch; and wherein the plurality of switches includes the power source-selection switch and the voltage-fed converter switch of the respective power input circuit; and the control circuit configured to output the at least one control signal to the control interface.

19. The system of claim 18, wherein:

N is greater than two;

the N power input circuits comprise a selected power input circuit and N−1 non-selected power input circuits;

the at least one control signal includes:

a first control signal for setting the power source-selection switch and the voltage-fed converter switch of the selected power input circuit to the operational state; and a second control signal for setting the power source-selection switch and the voltage-fed converter switch of the non-selected power input circuits to the non-operational state; and in response to receiving the at least one control signal from the control circuit, the selected power input circuit is configured to conduct electric energy received at the input node of the selected power input circuit to the output node of the power source-selection circuit, and the non-selected power input circuits are configured to block electrical energy applied to the input nodes of the non-selected power input circuits.

20. The system of claim 19, wherein, within each respective power input circuit:

an area that the power source-selection switch occupies is larger than a combined area that the voltage-fed converter switch and the source-selection capacitor occupy; and a switching speed at which the voltage-fed converter switch operates is faster than a switching speed at which the power source-selection switch operates.

* * * * *